United States Patent
Zachrai et al.

(10) Patent No.: US 6,590,164 B2
(45) Date of Patent: Jul. 8, 2003

(54) DEVICE FOR FASTENING A SUPPORT RAIL ON FRAME LEGS OF A RACK OF A SWITCHGEAR CABINET

(75) Inventors: Jürgen Zachrai, Dillenburg (DE); Hans Wagener, Dietzhölztal (DE)

(73) Assignee: Rittal Rudolf Loh GmbH & Co. KG, Herborn (DE)

( * ) Notice: Subject to any disclaimer, the term of this patent is extended or adjusted under 35 U.S.C. 154(b) by 0 days.

(21) Appl. No.: 09/761,097

(22) Filed: Jan. 16, 2001

(65) Prior Publication Data

US 2001/0037894 A1 Nov. 8, 2001

(30) Foreign Application Priority Data

Jan. 14, 2000 (DE) ........................................ 100 01 185

(51) Int. Cl.[7] .............................................. H01B 17/00
(52) U.S. Cl. ................ 174/149 B; 174/68.2; 174/70 B; 174/99 B; 174/138 G
(58) Field of Search ............................ 174/149 B, 68.2, 174/70 B, 99 B, 138 G; 248/49, 58, 65; 411/178, 383, 389, 384

(56) References Cited

U.S. PATENT DOCUMENTS

| | | | | |
|---|---|---|---|---|
| 3,315,132 A | * | 4/1967 | Lucas | 174/72 B |
| 4,112,249 A | * | 9/1978 | Carlson | 174/68.2 |
| 4,366,528 A | * | 12/1982 | Cole | 174/133 B |
| 4,419,715 A | * | 12/1983 | Pear | 174/133 B |
| 4,533,190 A | * | 8/1985 | Booty | 439/110 |
| 4,832,626 A | * | 5/1989 | Wagener | 439/715 |
| 5,008,494 A | * | 4/1991 | Wagener | 174/68.2 |
| 5,637,033 A | * | 6/1997 | Williams | 411/389 |
| 5,898,566 A | * | 4/1999 | Noschese et al. | 361/642 |
| 5,938,302 A | * | 8/1999 | Anderson et al. | 312/198 |
| 6,069,321 A | * | 5/2000 | Wagener et al. | 174/149 B |
| 6,070,957 A | * | 6/2000 | Zachrai | 312/265.1 |
| 6,169,248 B1 | * | 1/2001 | Rowe et al. | 174/50 |
| 6,230,903 B1 | * | 5/2001 | Abbott | 211/190 |

FOREIGN PATENT DOCUMENTS

DE 197 12 362 7/1998

* cited by examiner

Primary Examiner—Dean A. Reichard
Assistant Examiner—Jinhee Lee
(74) Attorney, Agent, or Firm—Pauley Petersen Kinne & Erickson

(57) ABSTRACT

A device for fastening a support rail on frame legs of a rack of a switchgear cabinet, wherein the frame legs have two fastening sides oriented perpendicularly with respect to each other and each has a row of square fastening perforations. Both ends of the support rail have fastening brackets which have at least one suspension hook and are matched to a cross section of the fastening perforations in the first fastening side of the frame legs spaced apart between the fastening brackets and to the spacing of the fastening perforations of the frame legs. A clamping plate is assigned to each fastening bracket of the support rail and has retaining claws and extends with the retaining claws behind the fastening perforations in the second fastening sides of the frame legs. The clamping plates have a threaded receiver for a clamping screw for maintaining them on the support rail in an elongated hole extending in the linear direction of the support rail and can be clamped together with them. The support rail can be used as a bus bar holder of a bus bar system.

21 Claims, 1 Drawing Sheet

DEVICE FOR FASTENING A SUPPORT RAIL ON FRAME LEGS OF A RACK OF A SWITCHGEAR CABINET

BACKGROUND OF THE INVENTION

1. Field of the Invention

This invention relates to a device for fastening a support rail on frame legs of a rack of a switchgear cabinet, wherein the frame legs have two fastening sides oriented perpendicularly with respect to each other and each has a row of square fastening perforations. Both ends of the support rail have fastening brackets which have at least one suspension hook and are matched to the cross section of the fastening perforations in the first fastening side of the frame legs spaced apart between the fastening brackets and to the spacing of the fastening perforations of the frame legs. A clamping plate is assigned to each fastening bracket of the support rail and has retaining claws that extend with the fastening perforations in the second fastening sides of the frame legs. The clamping plates have a threaded receiver for a clamping screw, by which they are maintained on the support rail in an elongated hole extending in a linear direction of the support rail and can be clamped together with the support rail.

2. Description of Related Art

A device of this type is known from German Patent Reference DE 197 12 362 C1 and is used to connect the support rail quickly and solidly with the frame legs of the switchgear cabinet rack.

The support rail, which has the suspension hook, can be provisionally suspended in fastening perforations of the frame legs and in mounting plates, so that the assembler has both hands free for further mounting work. The clamping plates, which are held on the support rail by the clamping screws, are also introduced into the fastening perforations of the frame leg, or are moved behind the retaining strip of the mounting plate.

The elongated holes in the support rail permit the adjustment of the clamping plates at the end of the support rail. When the clamping screws are tightened, the support rail and the clamping plates are clamped against each other. The support rail rests on a fastening side of the frame leg and the clamping plates enter with retaining claws into the fastening perforations of the fastening side extending perpendicularly with respect to the fastening side. The base leg of the support rail has fastening bores in the linear direction, which can be used for attaching devices to the support rail. However, the support rail is not optimally suited for fastening bus bars of a bus bar system, and thus is not adapted to the special requirements of a bus bar holder for making their mounting easier.

SUMMARY OF THE INVENTION

It is one object of this invention to provide a device of the type mentioned above but with simple means so that the support rail meets the requirements of a bus bar holder and simplifies the mounting of the bus bars of a bus bar system.

In accordance with this invention this object is attained with a device formed as a bus bar holder with a pair of threaded receivers per bus bar, into which retaining bolts with a threaded part, which is reduced in diameter, can be screwed. With the retaining bolts U-shaped insulating receivers can be fixed on the support rail, having a receiver matched to the exterior dimensions of the bus bars. The insulating retaining clip can be closed by a retaining strip, wherein the connecting screws can be screwed into screw receivers on the front face of the retaining bolts.

The pairs of threaded receivers are spaced apart, and the spacing between the pairs is matched to the prescribed arrangement of the bus bars of the bus bar system extending parallel with each other. Connected with the support rail, the insulating retaining clips form open receivers, into which bus bars of corresponding exterior dimension can be inserted. The bus bars are held in the insulating retaining clips with retaining strips which connect the free ends of the lateral legs of the insulating retaining clips, close the receiver and fix the inserted bus bar in place in the receiver.

If the support rail with a base leg and two lateral legs has a U-shaped cross section, and the clamping plates with a base leg and two lateral legs are also U-shaped and form a receiver for the support rail, then the support rail has sufficient stability to support even heavy bus bars. Also, the clamping plates can be easily adjusted in the linear direction on the support rail for bringing into a connecting position with the frame legs.

Connecting the insulating retaining clips with the pairs of threaded receivers of the support rail is easier because the insulating retaining clips have bores, which are stepped in diameter and are matched to the stepped retaining bolts. Bus bar systems for large current strengths often use bus bars with essentially square exterior dimensions. In one embodiment, the receiver of the insulating retaining clips is matched to the square exterior dimensions of the bus bar to be received, wherein a layout matches the pairs of threaded receivers of the support rail to the distance between the parallel bus bars of a multi-phase bus bar system.

The suspension of the support rail on the frame legs is simplified because the retaining claws of the clamping plate are formed on an edge of the clamping plate, extending vertically with respect to the linear direction of the support rail. The fastening sides of the frame legs are oriented transversely with respect to the linear direction of the support rail, wherein the direction for suspending the support rail is dictated by the orientation of the retaining claws and the frame legs.

The support rail and the clamping plates are advantageously embodied and produced as separate punched and bent elements.

In accordance with a further embodiment, the insulating retaining clips are assembled from a base plate and two lateral legs, or are made in one piece. The base plate and the lateral legs are made from an insulating material, for example plastic, in order to insulate the bus bar inserted into the receiver of the insulating retaining clip against the metal support rail.

In case of separate elements, for example a base plate and lateral legs, of the insulating retaining clips, it is advantageous for attaching these elements to the support rail if the base plate has cutouts at the end, which receive and position the lateral legs, and the base plate itself has positioning legs which are at a distance from the lateral legs and delimit a receiver for the lateral legs of the support rail. The retaining strip has laterally protruding positioning strips which form stops for the lateral supports of the insulating retaining clip.

In a further embodiment, the frame legs can be replaced by mounting rails, having a second fastening side designed as a retaining strip. The retaining claws of the clamping plates extend behind this retaining strip because the mounting rails have rows of fastening perforations only in the base leg. With the mounting rails it is possible to create connecting points in the switchgear cabinet, even if the parallel extending frame legs have a greater distance from each other than the fastening brackets of the support rail. The mounting rails can be connected with the frame legs of the rack of the switchgear cabinet.

BRIEF DESCRIPTION OF THE DRAWINGS

This invention will be explained in greater detail in view of an embodiment shown in the drawings, wherein:

The single drawing FIGURE is an exploded partial view of a corner of a switchgear cabinet rack showing elements of this invention.

DESCRIPTION OF PREFERRED EMBODIMENTS

Figure 1:
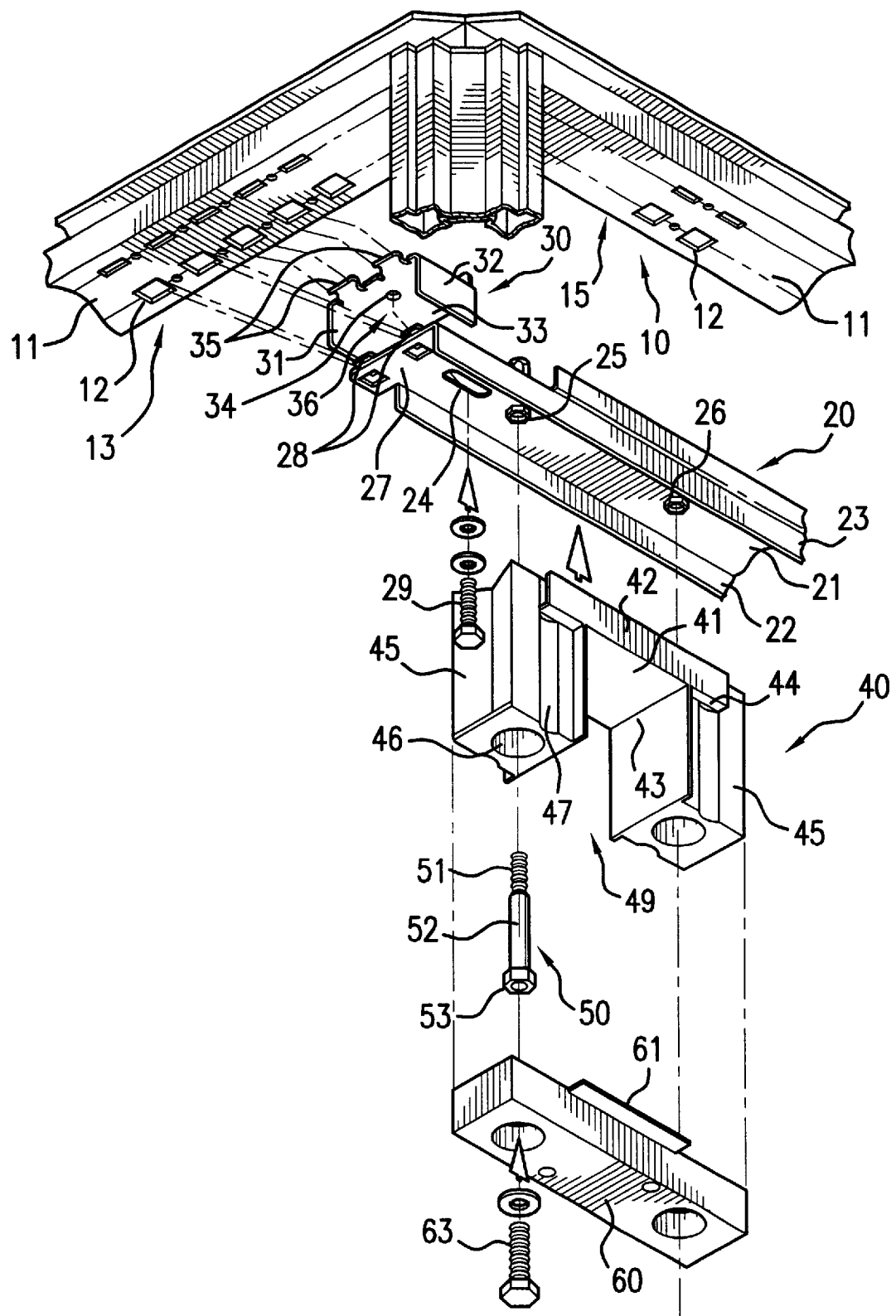

Three frame legs 10 of a switchgear cabinet rack which meet at right angles are shown in the upper portion of the drawing wherein, for example, the left, horizontally extending frame leg faces the rear of the switchgear cabinet, and the right horizontal frame leg faces the front of the switchgear cabinet. A support rail 20 as a bus bar holder is connected with the rack and is also oriented toward the front, so that the bus bars which are to be connected with the support rail 20 extend parallel with the rear and are arranged at the prescribed distance from each other in a horizontal plane.

The frame legs 10 have a first, horizontal fastening side 11, and an adjoining, vertical second fastening side 13. Both fastening sides 11 and 13 have a row of square retaining perforations 12 which are aligned with each other and extend in the same distance from the inner edge 15 of the frame legs 10 formed by the fastening sides 11 and 13.

With a base leg 21 and the two lateral legs 22 and 23, the support rail 20 has a U-shape and is sufficiently stable and can be reinforced by a reinforcement rail on the outside of the support rail. On its ends, the support rail 20 terminates in fastening brackets 27, from which two hooks 28 are punched out and bent off. The hooks 28, formed as suspension hooks, are aligned transversely to the linear direction of the support rail 20, and a width of the hook 28 is matched to the lateral length of the square retaining perforations 12, so that the hooks 28 can be easily inserted into them, wherein the orientation of the hooks 28 determines the suspension direction. U-shaped clamping plates 30 are displaceable to a limited extent on the fastening brackets 27 of the support rail 20, wherein the clamping screw 29, which is conducted through an elongated hole 24 in the support rail 20, is screwed into a threaded receiver 34 in the base leg 33 of the clamping plate. When the support rail 20 is suspended in the frame legs 10, the clamping plates 30 are displaced in the direction toward the frame legs 10. During this the retaining claws 35 of the clamping plates 30 are introduced into the fastening perforations 12 of the vertical fastening sides 13. The clamping screws 29 are tightened and the clamping plate 30 is clamped together with the frame legs 10 and the support rail 20. The clamping plates 30 with their base leg 33 and the two lateral legs 31 and 32 form a U-shaped receiver 36, which encloses the U-shaped fastening ends of the support rail 20. If a mounting rail is required, because the support rail 20 is shorter than the distance to the front frame leg 10, the retaining claws 35 of the associated clamping plate 30 extend behind the retaining strip of the mounting rail because the mounting rail has no fastening perforations 12 like the frame leg 10. Only in the base leg do the mounting rails have rows of fastening perforations 12, which can be occupied by the suspension hooks 27 of the support rail 20.

The base leg 21 of the support rail 20 has a pair of threaded receivers 25 and 26 per bus bar of the bus bar system, which already take the distance between the bus bars into account and which themselves have a distance from each other, which is matched to the fastening of an insulating retaining clip 40 for the associated bus bar. The threaded receivers 25 and 26 can be formed by inserted threaded bushings, for example. The insulating retaining clips 40 have a base plate 41 and two lateral legs 45, which form an open receiver 49, which is matched to the exterior dimensions of the bus bar to be inserted. In this case the base plate 41 and the lateral legs 45 can be separate elements, or can be combined into one piece. The base plate 41 and the lateral legs are made of an insulating material, for example plastic. On its ends, the base leg 41 has cutouts 43, which receive and position the lateral legs 45, wherein the elements 44 of the base leg 41 engage with positioning receivers 47 of the lateral legs 45, if this is an assembled insulating retaining clip 40.

In addition, the positioning legs 42 are formed on the linear sides of the base leg 44, which form a receiver in the direction toward the lateral legs 45 for the lateral legs 22 and 23 of the support rail 20 and cover them in the area of the inserted bus bar.

The lateral legs 45 of the insulating retaining clip 40 have bores 46 extending through them and stepped in diameter for retaining bolts 50. The retaining bolts 50 terminate in threaded parts 51, which can be screwed into the threaded receivers 25 and 26 of the support rail 20. In this case the cylindrical sections 52 of the retaining bolts 50 are supported on shoulders of the bores 46 of the lateral legs 45, so that the insulating retaining clip 40 can be screwed to the support rail 20. Through the bores 46 the threaded receivers 53 at the front of the retaining bolts 50 are accessible. Connecting screws 63 pass through bores 62 of a retaining strip 60 and can be screwed into the threaded receivers 53, to connect a retaining strip 60 with the lateral legs 45 of the insulating retaining clip 40 and fix the inserted bus bar in place in the receiver 49, which is now closed. Positioning strips 61 can make the application of the retaining strip 60 easier.

The base plate 41 of the insulating retaining clip 40 can also be inserted between the lateral legs 45, which are connected with the support rail 20, wherein the elements 44 of the base plate 41 are guided in the positioning grooves 47 of the lateral legs 45, and the base plate 41 is held, resting against the support rail 20, by the inserted bus bar.

What is claimed is:

1. In a device for fastening a support rail on frame legs of a rack of a switchgear cabinet, the frame legs having two fastening sides oriented perpendicularly with respect to each other and each said frame legs having a row of square fastening perforations, both ends of the support rail having fastening brackets with at least one suspension hook and matched to a cross section of fastening perforations in a first fastening side of the frame legs spaced apart between the fastening brackets and matched to a spacing of the fastening perforations of the frame legs, a clamping plate assigned to each of the fastening brackets of the support rail, the clamping plate having retaining claws and extending with the retaining claws behind the fastening perforations in second ones of the fastening sides of the frame legs, and the clamping plate having a threaded receiver for a clamping screw by which the clamping plate is maintained on the support rail in an elongated hole extending in a linear direction of the support rail and the clamping plate clamped together with the support rail, the improvement comprising:

a bus bar holder including the support rail (20) having a pair of threaded receivers (25, 26) each receiving a threaded part (51) of a retaining bolt (50), the retaining bolt (50) having a head and a cylindrical section (52), the threaded part (51) being reduced in diameter with respect to the cylindrical section (52) in a stepped arrangement, the retaining bolt (50) fixing a U-shaped insulating receiver (40) on the support rail (20), the insulating receiver (40) having a receiver (49) matched to exterior dimensions of a bus bar, the insulating receiver (40) including a bore (46) which is stepped in diameter to form a shoulder matched to the stepped arrangement of the cylindrical section (52) and the threaded part (51) of the retaining bolt (50), the insulating receiver (40) closed by a retaining strip (60), and a plurality of connecting screws (63) each screwed within a screw receiver of the cylindrical section (52); and the support rail (20) having a base leg (21) and two lateral legs (22, 23) and a U-shaped cross section, and the clamping plate (30) having a base leg (33) and two lateral legs (31, 32) formed in a U-shape and forming a receiver (36) for the support rail (20).

2. In the device in accordance with claim 1, wherein the receiver (49) of the insulating receiver (40) is matched to square exterior dimensions of the bus bar.

3. In the device in accordance with claim 2, wherein the pair of threaded receivers (25, 26) of the support rail (20) are matched to a distance between parallel bus bars of a multi-phase bus bar system.

4. In the device in accordance with claim 3, wherein the retaining claws (35) of the clamping plate (30) are formed on an edge of the clamping plate (30) extending vertically with respect to the linear direction of the support rail (20).

5. In to device in accordance wit claim 4; wherein the support rail (20) and the clamping plate (30) are embodied and produced as separate punched and bent elements.

6. In the device in accordance with claim 5, wherein the insulating receiver (40) is one of assembled from a base plate (41) and two lateral legs (45) and made as an integrated piece.

7. In the device in accordance with claim 6, wherein the fastening sides (11, 13) of the frame legs (10) are oriented transversely with respect to the linear direction of the support rail (20).

8. In the device in accordance with claim 6, wherein the base plate (41) has cutouts (43) at an end which receive and position the lateral legs (45).

9. In the device in accordance with claim 8, wherein the fastening sides (11, 13) of the frame legs (10) are oriented transversely with respect to the linear direction of the support rail (20).

10. In the device in accordance with claim 9, wherein the retaining strip (60) has a laterally protruding positioning strip (61), which forms a stop for the lateral legs (45) of the insulating receiver (40).

11. In the device in accordance with claim 10, wherein the frame legs (10) are replaceable with mounting rails having a second fastening side designed as a retaining strip, and the retaining claws (35) of the clamping plate (30) extend behind the retaining strip.

12. In a device for fastening a support rail on frame legs of a rack of a switchgear cabinet, the frame legs having two fastening sides oriented perpendicularly with respect to each other and each having a row of square fastening perforations, both ends of the support rail having fastening brackets with at least one suspension hook and matched to a cross section of fastening perforations in a first fastening side of the frame legs spaced apart between the fastening brackets and matched to a spacing of the fastening perforations of the frame legs, a clamping plate assigned to each of the fastening brackets of the support rail, the clamping plate having retaining claws and extending with the retaining claws behind the fastening perforations in second ones of the fastening sides of the frame legs, and the clamping plate having a threaded receiver for a clamping screw by which the clamping plate is maintained on the support rail in an elongated hole extending in a linear direction of the support rail and the clamping plate clamped together with the support rail, the improvement comprising:

a bus bar holder including the support rail (20) having a pair of threaded receivers (25, 26) each receiving a threaded part (51) of a retaining bolt (50), the retaining bolt (50) having a head and a cylindrical section (52), the threaded part (51) being reduced in diameter with respect to the cylindrical section (52) in a stepped arrangement, the retaining bolt (50) fixing a U-shaped insulating receiver (40) on the support rail (20), the insulating receiver (40) including a bore (46) which is stepped in diameter to form a shoulder matched to the stepped arrangement of the cylindrical section (52) and the threaded part (51) of the retaining bolt (50), the insulating receiver (40) having a receiver (49) matched to exterior dimensions of a bus bar, the insulating receiver (40) closed by a retaining strip (60), and a plurality of connecting screws (63) each screwed within a screw receiver of the cylindrical section (52).

13. In the device in accordance with claim 12, wherein the receiver (49) of the insulating receiver (40) is matched to square exterior dimensions of the bus bar.

14. In the device in accordance with claim 12, wherein the pair of threaded receivers (25, 26) of the support rail (20) are matched to a distance between the parallel bus bars of a multi-phase bus bar system.

15. In the device in accordance with claim 12, wherein the retaining claws (35) of the clamping plate (30) are formed on an edge of the clamping plate (30) extending vertically with respect to the linear direction of the support rail (20).

16. In the device in accordance with claim 12, wherein the support rail (20) and the clamping plate (30) are embodied and produced as separate punched and bent elements.

17. In the device in accordance with claim 12, wherein the retaining strip (60) has a laterally protruding positioning strip (61), which forms a stop for lateral legs (45) of the insulating receiver (40).

18. In the device in accordance with claim 12, wherein the fastening sides (11, 13) of the frame legs (10) are oriented transversely with respect to the linear direction of the support rail (20).

19. In the device in accordance with claim 12, wherein the frame legs (10) are replaceable with mounting rails having a second fastening side designed as a retaining strip, and the retaining claws (35) of the clamping plate (30) extend behind the retaining strip.

20. In the device in accordance with claim 12, wherein the insulating receiver (40) is one of assembled from a base plate (41) and two lateral legs (45) and made as an integrated piece.

21. In the device in accordance with claim 2, wherein the base plate (41) has cutouts (43) at an end which receive and position the lateral legs (45).

* * * * *